(12) United States Patent
Shah et al.

(10) Patent No.: US 8,591,188 B2
(45) Date of Patent: Nov. 26, 2013

(54) DISPLACEMENT SENSOR SYSTEM AND METHOD OF OPERATION

(75) Inventors: Minesh Ashok Shah, Clifton Park, NY (US); Mahadevan Balasubramaniam, Clifton Park, NY (US); Philip Paul Beauchamp, Rexford, NY (US); Todd Alan Anderson, Niskayuna, NY (US); Samhita Dasgupta, Niskayuna, NY (US); David Mulford Shaddock, Troy, NY (US); Emad Andarawis Andarawis, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 2188 days.

(21) Appl. No.: 11/115,736

(22) Filed: Apr. 26, 2005

(65) Prior Publication Data
US 2006/0239813 A1  Oct. 26, 2006

(51) Int. Cl.
*F01D 19/00* (2006.01)
*F01D 17/02* (2006.01)

(52) U.S. Cl.
USPC .......................................................... 416/61

(58) Field of Classification Search
USPC .......... 415/13, 14, 118, 173.2, 173.3; 416/31, 416/61
See application file for complete search history.

(56) References Cited

U.S. PATENT DOCUMENTS

| | | | | |
|---|---|---|---|---|
| 4,573,358 A | * | 3/1986 | Luongo | 73/660 |
| 4,644,270 A | * | 2/1987 | Oates et al. | 324/207.25 |
| 4,934,192 A | * | 6/1990 | Jenkins | 73/660 |
| 5,119,036 A | * | 6/1992 | Rickards et al. | 324/662 |
| 5,990,807 A | | 11/1999 | Cloutier et al. | 340/870.37 |
| 6,152,685 A | * | 11/2000 | Hagi | 415/14 |
| 6,401,460 B1 | * | 6/2002 | Xia | 60/782 |
| 2003/0215323 A1 | | 11/2003 | Prinz et al. | 415/14 |

* cited by examiner

*Primary Examiner* — Nathaniel Wiehe
*Assistant Examiner* — Sean J Younger
(74) *Attorney, Agent, or Firm* — Nitin Joshi

(57) ABSTRACT

A clearance sensing system for a rotating machine includes a plurality of sensor probes disposed within a stationary shroud of the rotating machine. Each of the plurality of sensor probes is adapted to measure a parameter indicative of an axial and a radial displacement of a rotating component within the shroud and to produce a signal that corresponds to the parameter. In certain embodiments, this parameter may include a capacitance between the rotating component and the sensor probe. The clearance sensing system further includes a circuit that receives the signal from each of the plurality of sensor probes and determines (a) the axial displacement of the rotating component within the shroud and (b) a radial displacement of the rotating component relative to the shroud.

22 Claims, 10 Drawing Sheets

DISPLACEMENT SENSOR SYSTEM AND METHOD OF OPERATION

BACKGROUND

The invention relates generally to the field of sensors, and particularly to sensors for measuring relative displacement between rotating and moving components in a rotating machine. Specific embodiments of the present technique provide a system and method for sensing radial clearance and relative axial displacement of the rotating components, such as blades and seal tips with respect to the stationary shroud in a turbine engine.

Efficiency and performance of gas and steam turbines are affected by clearances between tips of the rotating blades and the stationary shrouds. In a turbine stage, the portion of the working fluid that passes through the clearance between the tips of the turbine blades and the static shroud does no work on the rotor blades, and hence leads to a reduced work efficiency of the turbine stage. Hence, in the design of gas and steam turbines, it is desirable to have a close tolerance between the tips of the rotor blades and the surrounding static shroud. In certain turbine stages, tips of the rotating blades have continuous knife-edges (also known as seal teeth or packing teeth) that mesh corresponding grooves on the stationary shroud to provide sealing of the gas path between the rotating blades and the shroud.

However, clearance dimensions between the rotating blades and the shroud vary during various operating conditions of the turbine engine. A significant reason for this is the dissimilar thermal growth within the engine between the blade tips and the shroud surrounding them, for example, during start-up of the turbine engine. In such a case, the high temperature of the working fluid causes the blades to be at a higher temperature than the surrounding shroud. As a result, the blades expand radially with respect to the shroud and the clearance between the shroud and the blades decreases, which may cause the interfacing surfaces of the blades and the shroud to rub, resulting in an increased engine cold start-up time. Further, during such thermal transients, the blades expand axially with respect to the shroud, which may lead to interference of the blade tips with grooves or rails on the stationary shroud.

In order to facilitate lower engine start-up times and to avoid rubbing or interference between the static and rotating components, it is desirable to obtain an accurate on-line or real-time measurement of the radial and axial displacements at various turbine stages to insure that radial and axial clearances are maintained. However, currently, clearances between the blades or seal teeth and the shroud are generally determined based on thermal models, which may often be inaccurate. The use of models to determine clearances may result in a relatively long warm-up time before a turbine may be started because model prediction results cannot be relied on to be accurate. Thus, turbine users tend to add extra time to the model prediction results in an effort to help ensure that adequate clearance exists prior to turbine start-up. Further, no technique currently exists to measure axial clearance at the turbine stages. Generally, the axial displacement of the blades with respect to the shroud is measured at the exit of the turbine by correlating the displacement of the entire shell at one end and the displacement of the rotor at that same end. The above technique may prove ineffective because growth of individual stages need not be essentially linear due to bulk of material distributed around certain stages form a bigger thermal sink than the rest of the engine.

Accordingly, there is a need for a system and method for on-line and unified measurement of radial and axial displacements within the turbine engine at a given stage.

BRIEF DESCRIPTION

Briefly, in accordance with one embodiment of the present technique, a rotating machine is provided. The rotating machine includes a rotating component affixed to a shaft for rotation within a stationary shroud. The rotating machine further includes a plurality of sensors disposed within the shroud, each of the plurality of sensors being adapted to measure a parameter indicative of an axial and a radial. displacement of the rotating component within the shroud and to produce a signal that corresponds to the parameter. The rotating component may include a blade or seal teeth on the tip of the rotating blade. The rotating machine also includes a circuit that receives the signal from each of the plurality of sensors and in response thereto calculates (a) the axial displacement of the rotating component within the shroud and (b) a radial displacement of the rotating component relative to the shroud.

In accordance with another aspect, the present technique provides a clearance sensing system for a rotating machine. The clearance sensing system includes a plurality of sensor probes disposed within a stationary shroud of the rotating machine. Each of the plurality of sensor probes is adapted to measure a parameter indicative of an axial and a radial displacement of a rotating component within the shroud and to produce a signal that corresponds to the parameter. In certain embodiments, this parameter may include a capacitance between the rotating component and the sensor probe. The clearance sensing system further includes a circuit that receives the signal from each of the plurality of sensor probes and determines (a) the axial displacement of the rotating component within the shroud and (b) a radial displacement of the rotating component relative to the shroud.

In accordance with yet another aspect, the present technique provides a method for sensing a clearance between a rotating component and a stationary shroud of a rotating machine. The method includes sensing a capacitance between the rotating component and the shroud and producing a signal corresponding to the sensed capacitance. The method then involves determining an axial position of the rotating component within the shroud and in response to the signal.

DRAWINGS

These and other features, aspects, and advantages of the present invention will become better understood when the following detailed description is read with reference to the accompanying drawings in which like characters represent like parts throughout the drawings, wherein.

Figure 8:
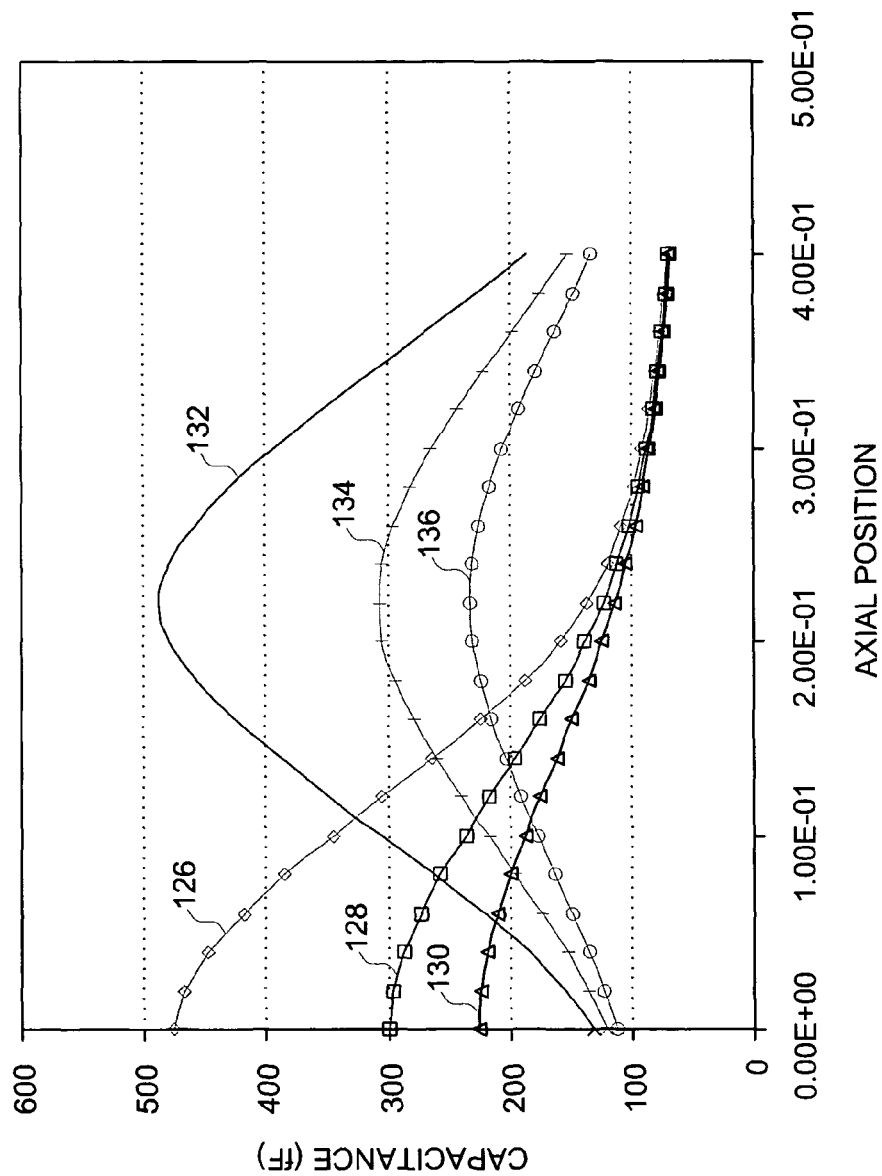
Figure 9:
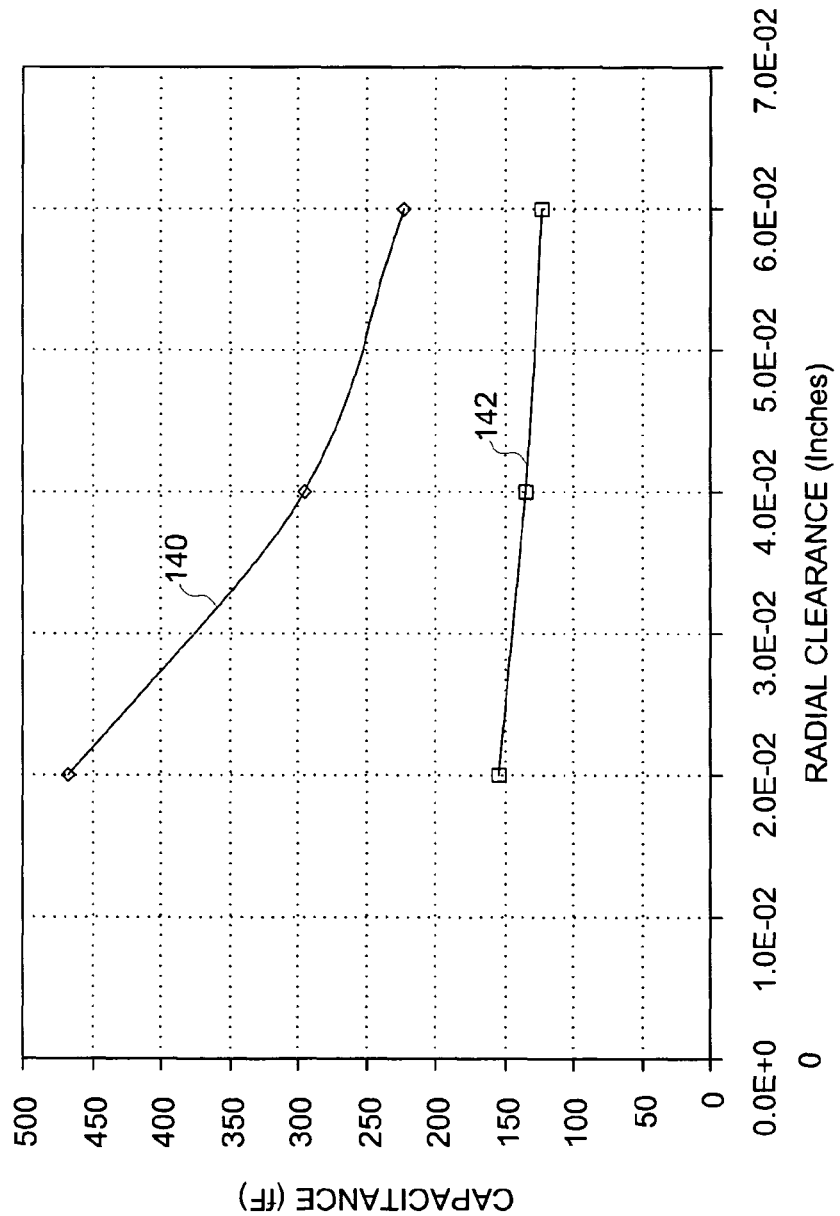
Figure 10:
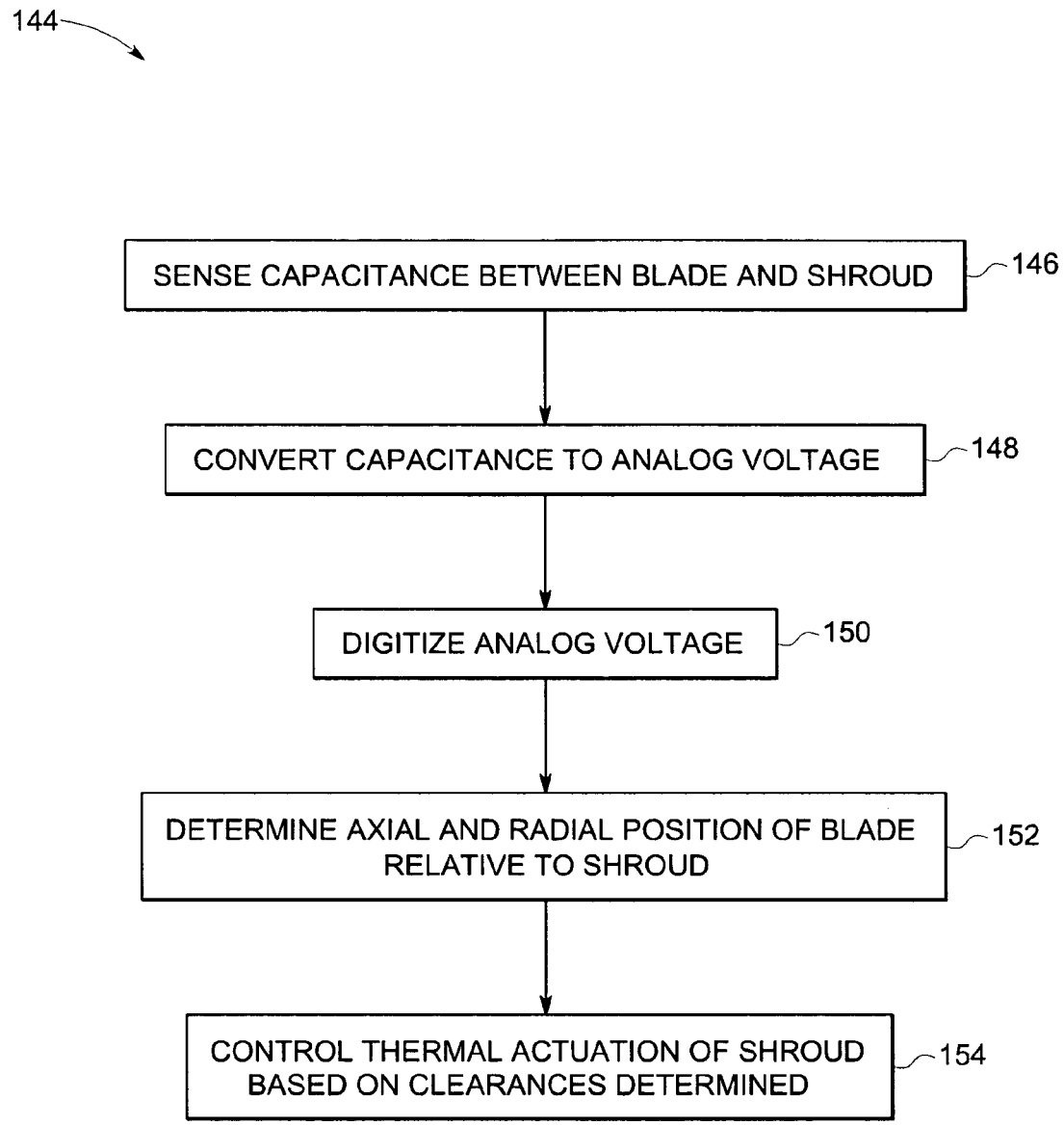

FIG. 8 a graphical representation of a calibration curve illustrating variation of capacitive response with variation of axial position of a rotating component (for different families of radial clearance) within shroud according to aspects of the present technique;

FIG. 9 a graphical representation of a calibration curve illustrating variation of capacitive response with radial clearance according to aspects of the present technique; and FIG. 10 is a flow chart illustrating an exemplary method of sensing a clearance between a blade and a stationary shroud in accordance with one embodiment of the present technique.

Can we add a figure to say that the seal teeth has 2 notches. These notches helps to introduce a spike in the signal that will be used for self calibrating the system and ensure that we are not affected by signal drifts. Please see attached image to illustrate the notch in the seal.

DETAILED DESCRIPTION

The following description presents a novel technique for measuring axial displacements as well as radial clearances between rotating and stationary components in a rotating machine. For example, the present technique may find application in a steam turbine to measure radial and axial displacements of the rotating blades or the seal teeth with respect to the surrounding stationary shroud. In one embodiment of the present technique, radial and axial displacements are sensed by measuring a capacitance between the tips of the rotating blades or seal teeth and one or more sensors disposed on the shroud. The displacements thus measured may then be incorporated into a control strategy to insure that that there is no rub or interference due to thermal growth in both radial and axial directions between the rotating and static parts during operation of the turbine. Advantageously, the technique described facilitates an in situ real time measurement of axial and radial displacement at a given stage, as opposed to measurements made outside the turbine that measure gross growth of the rotor and stator in the axial directions and back calculating the approximate growth in the individual stages, and hence do not allow for clearance determination at individual stages. Embodiments of the present technique are described hereinafter referring generally to FIGS. 1-9.

Figure 1:
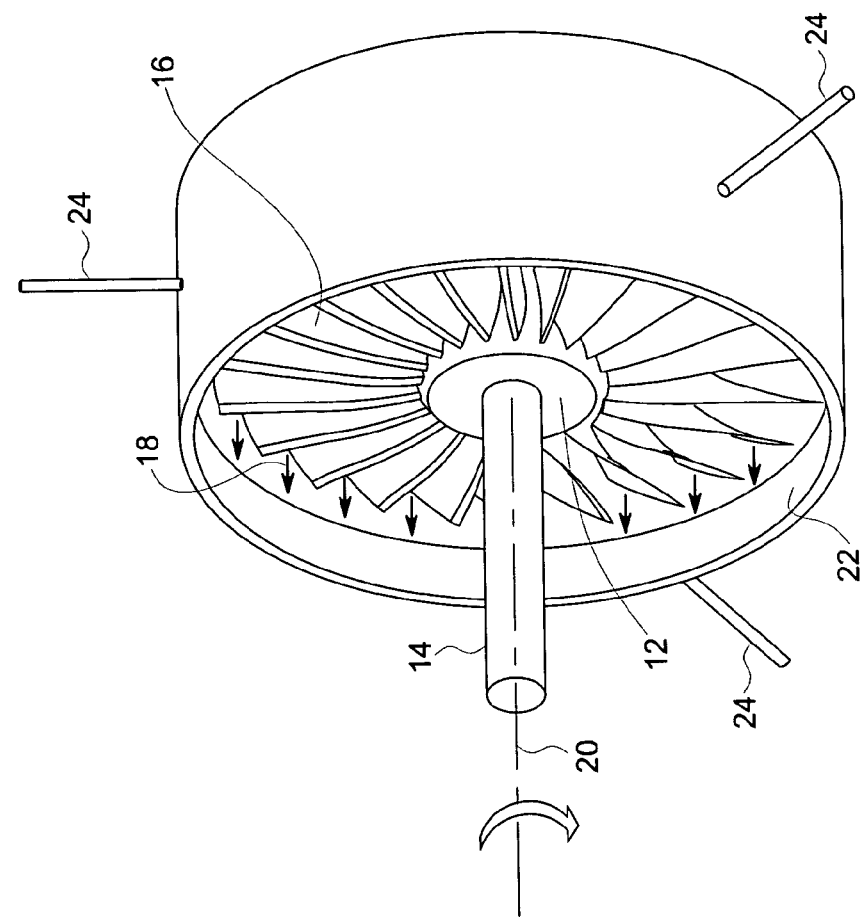
FIG. 1 illustrates a perspective view of a rotating machine, such as a steam turbine, wherein aspects of the present technique can be incorporated.

FIG. 1 is a perspective view of a rotating machine, such as a steam turbine 10, wherein aspects of the present technique can be incorporated. The steam turbine 10 includes a rotor 12 mounted on a shaft 14. A plurality of turbine blades 16, which may also be referred to as buckets, are affixed to the rotor 12. In operation, the blades 16 are subject to steam 18 at a high temperature and pressure, which does work on the blades 16 and causes them to rotate about an axis 20. The blades 16 rotate within a stationary housing or shroud 22 that is positioned radially around the blades 16. There is a relatively small clearance between the blades 16 and the shroud 22 to prevent excessive leakage of the working fluid, i.e. steam, between the blades 16 and the shroud 22. In accordance with the present technique, one or more clearance sensors 24 are disposed within and circumferentially around the stationary shroud 22. As explained in detail hereinafter, each of the sensors 24 is configured to generate a signal indicative of a radial and an axial position of the blades 16 with respect to the shroud 22 at their respective circumferential locations.

Figure 2:
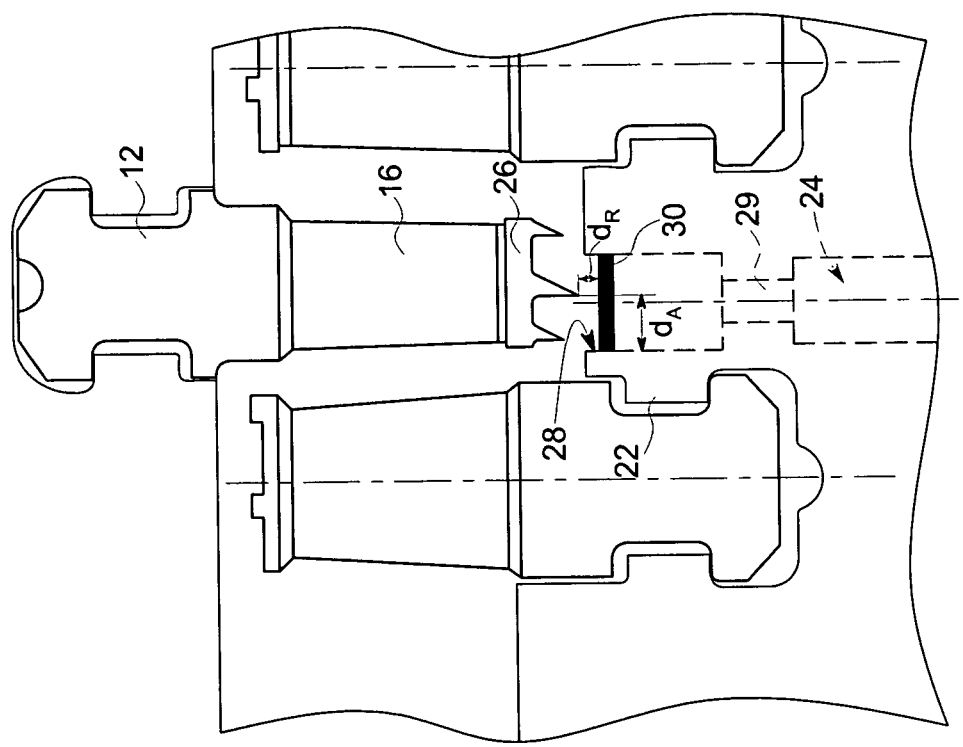
FIG. 2 is a cross-sectional view of a portion of a steam turbine wherein the present clearance control technique can be used.

Referring now to FIG. 2, a cross-sectional view is shown for a portion of the steam turbine 10, illustrating exemplary radial and axial clearance dimensions that may be measured by the present technique. In the illustrated embodiment, the tip of the blade 16 comprises packing teeth or seal teeth 26 that mesh into a grove 28 provided on the inner circumference of the shroud 22. The radial clearance between the seal teeth 26 and the shroud 22 is designated by $d_R$ and the axial relationship between the teeth 26 and the shroud 22 is designated by $d_A$. As explained earlier, due to differences in the rate of thermal expansion of the shroud 22 and the rotor 12, there is a potential that the radial clearance $d_R$ may be reduced to zero, leading to interference between the seal teeth 26 and the groove 28. Further, due to this differential rate of expansion, the rotor 12 may grow axially with respect to the shroud 22, leading axial rubbing of the teeth 26 within the grove 28, thus damaging the components. The present technique provides an on-line measurement of $d_R$ and $d_A$, which may be incorporated into a closed-loop control strategy to maintain these clearances at values within acceptable limits. The control strategy may include, for example, thermal actuation of the shroud 22, causing it to appropriately expand when the clearance between the shroud 22 and the seal teeth 26 decreases. In a different embodiment, mechanical actuators may be used to compensate for axial growth of the blade 16 within the shroud 22.

Radial and axial displacements of the seal teeth 26 with respect to the shroud 22 are estimated on-line using the sensor 24. The sensor 24 is disposed within a probe access passageway 29 provided in the shroud 22, and includes a sensor head 30 positioned in close proximity to the seal teeth 26. In the illustrated embodiment, $d_r$ is clearance between shroud 22 and the seal teeth. It may be possible that the sensor head 30 is flush with the shroud 22, but it may not be essential. In certain embodiments, the sensor head 30 is pulled back by some distance to prevent it from getting damaged during any rubs. In accordance with one embodiment of the present technique, the sensor head 30 comprises one or more capacitive probes (see FIG. 3) adapted to measure a capacitance between the seal teeth 26 and the tip of the probe. As will be appreciated by those of ordinary skill in the art, the capacitance between two objects is a function of the overlap surface area and the separation between the two objects. In the present embodiment, the capacitance between the blade 16 and the sensor head 30 is a function of the distance between the two, i.e. $d_R$, and the overlap area, which in turn is directly proportional to the axial relationship $d_A$ of the seal teeth 26 with the shroud 22. As the rotor 12 expands radially, the clearance $d_R$ between the seal teeth 26 and the shroud 22 changes. Similarly, as the seal teeth 26 move axially across the grove 28, the area of the sensor head 30 covered by the seal teeth 26 will change. These changes will result in a change in measured capacitance. In accordance with aspects of the present technique discussed below, the change in capacitance can be correlated to axial and radial displacements and hence a composite clearance measurement can be obtained. Generally, the axial growth of the blade 16 within the shroud 22 is substantially larger in magnitude than the radial growth. For example, under certain conditions, the axial displacement of the seal teeth 26 may be as high as 0.5 to 0.75 inches, which may be about ten times the radial displacement within the shroud 22. It should be noted that certain turbine stages do not have seal teeth on the tip of the blades. In such applications, the present technique may be used for measuring radial and axial clearances between the tip of the bare blade and the shroud.

Figure 3:
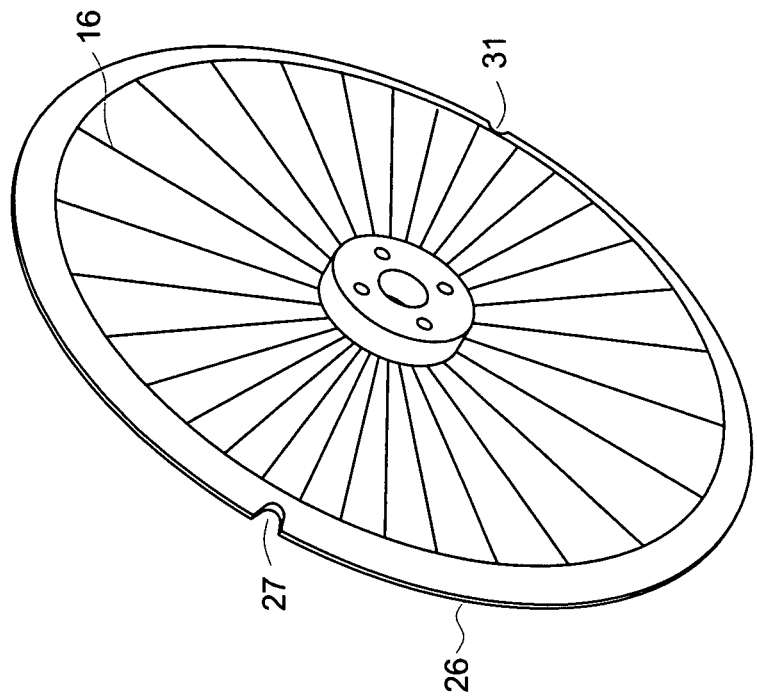
FIG. 3 illustrates a grooved rotor having seal teeth with notches according an exemplary embodiment of the present technique.
Figure 3:

FIG. 3 illustrates a perspective view rotor 16 having seal teeth 26 at the tip of the blades 16. The seal teeth 26 form a continuous, and hence, capacitance measurements between the teeth 26 and the sensor 24 would a produce nearly continuous signal. However, due to electron drift, this signal may show a steady shift, which may be wrongly correlated to radial and axial displacements. According to one embodiment of the present technique, the seal teeth 26 are provided with diametrically opposite notches or grooves 27 and 31 to calibrate this error. The radii of the notches 27 and 31 generally cover the dimension of the capacitive probes and the height of these notches is generally known apriori. The notches 27 and 31 introduce a spike in the signal produced by the capacitive probes that can be used for self calibrating the sensing system and ensure that measurements are not affected by signal drafts.

Figure 4:
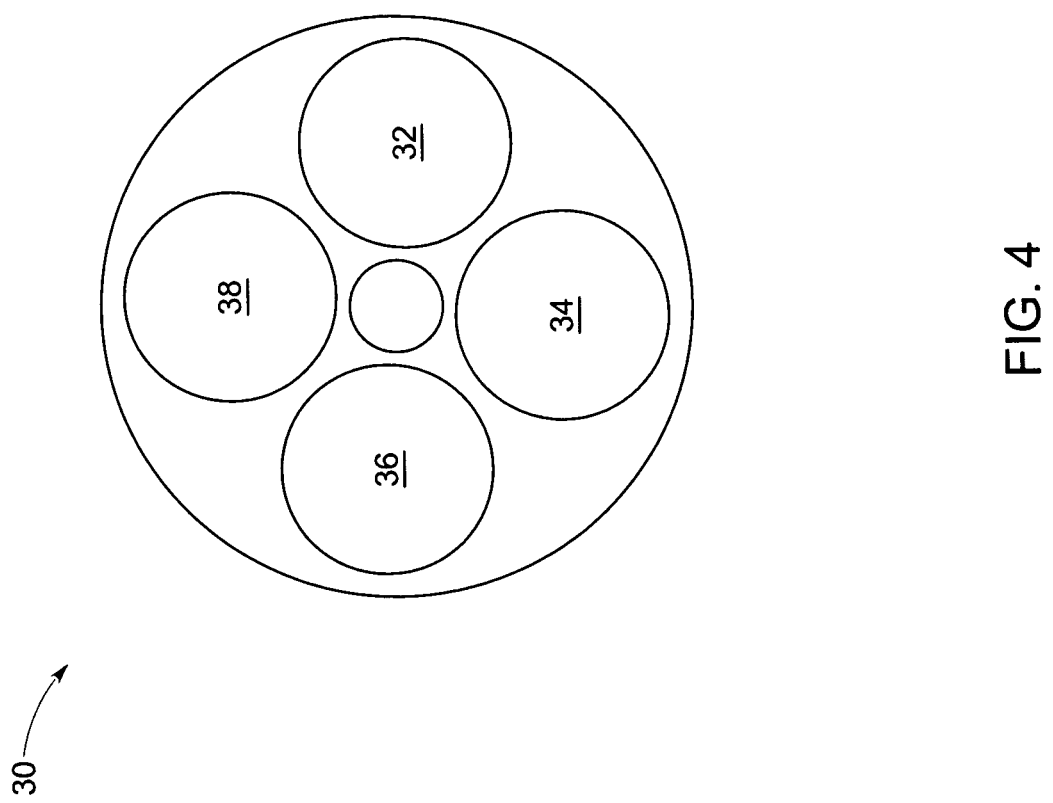
FIG. 4 is a plan view of a sensor probe in accordance with one embodiment of the present technique.

FIG. 4 illustrates a plan view or a probe side view of a sensor head 30 in accordance with one embodiment of the present technique. The sensor head 30 is provided with a plurality of capacitive probes 32, 34, 36 and 38, which may include, for example, electrically conductive shafts. The illustrated geometry and relative locations of the probes 32, 34, 36 and 38 facilitate measurement of a large axial displacement range, for example, in excess of 0.5 inches, while providing a desirable resolution for radial measurements, for example, for measuring displacements of the order of 0.01 inches. The above feature is advantageous in applications where the axial displacements of the blade 16 are substantially larger than the radial; displacements with respect to the shroud 22. In the illustrated embodiment, the probes 32, 34, 36 and 38 are positioned in a staggered manner, having a diamond shaped configuration, on the sensor head 30, to maximize sensitivity to change in overlap area. Other staggered configurations may be conceived in embodiments having greater or lesser number of probes. The diameters of the probes 32, 34, 36 and 38 at the head or tip portion are suitably large enough to provide adequate overlap surface between them and the tip of the blade 16. However, these conductive shafts or probes are narrower in diameter towards the stem portions than at the tip portions, in order to reduce measurement cross talk between them. In an exemplary embodiment, a probe may have a diameter of about 0.22" (approximately 5.58 mm) at the tip and about 0.077" (approximately 1.956 mm) toward the stem portion. In the illustrated embodiment, i.e. for a steam turbine application, the probes 32, 34, 36 and 38 may be formed from a material comprising nickel, aluminum, cobalt, or combinations thereof, such as Kovar. However in applications involving higher temperatures, for example for temperatures in excess of 1000 degrees centigrade, a material comprising platinum, rhodium, or combinations thereof may be used.

Figure 5:
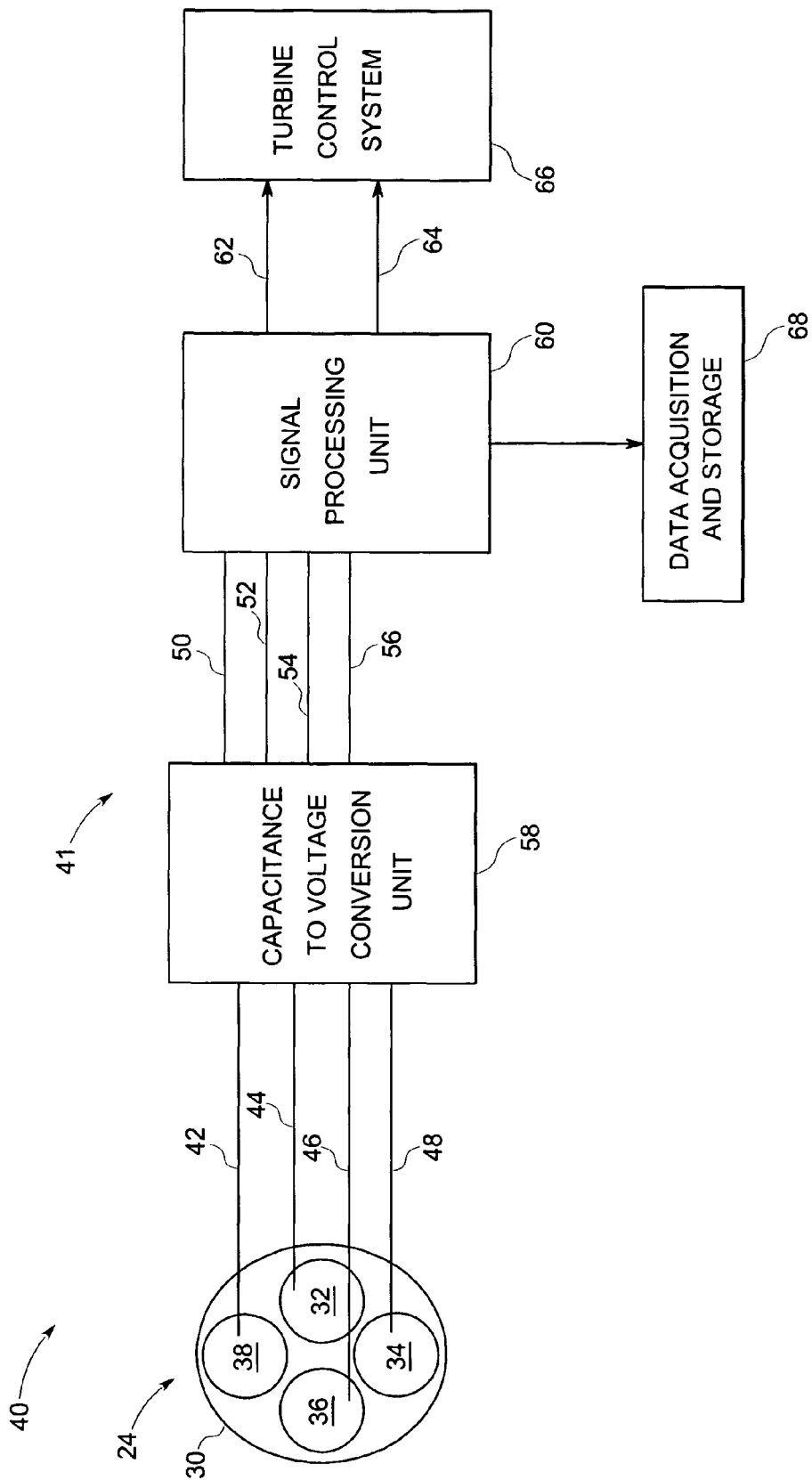
FIG. 5 is a block diagram of a clearance sensing system in accordance with aspects of the present technique.

Referring now to FIG. 5, a clearance system 40 is illustrated in accordance with an embodiment of the present technique. The clearance system 40 includes a clearance sensor 24 coupled to a clearance measurement and control circuit 41. The circuit 41 may comprise analog components, digital components, or a combination of analog and digital components. In the illustrated embodiment, the circuit 41 includes a capacitance to voltage conversion unit 58 and a signal processing unit 60 and may be coupled to a turbine control system 66. The clearance sensor includes capacitive probes 32, 34, 36 and 38 disposed on a sensor head 30 that is grounded. In the illustrated embodiment, the probes 32, 34, 36, 38 are excited by a signal generator (not shown) that switches between different probe tips and grounds the remaining probe tips. Under excitation the probes produce measurement signals 42, 44, 46 and 48 respectively, indicative of the capacitance between the teeth 26 of the blade 16 and the respective probe. According to one embodiment of the present technique, measurement signals from the probes are selectively utilized for inferring radial and axial displacements of the blade 16, based upon the current axial position of the blade 16 with the shroud 22. As an example, in the illustrated embodiment, let us consider the probes 32, 34, 36 and 38 to occupy positions corresponding to 3 O'clock, 6O'clock, 9 O'clock and 12 O'clock respectively. Now if the location of a blade is in the right hand side of the sensor head, only a pair of probes, such as 32 and 34, or 32 and 38 may be excited to obtain a measurement signal. The measurement signals 42, 44, 46 and 48, indicative of measured capacitances are transformed into analog voltage signals 50, 52, 54, 56 via a capacitance to voltage conversion unit 58, described in greater detail below. The measurement signals 42, 44, 46 and 48 may be communicated to the capacitance to voltage conversion unit 58 via transmission channel comprising, for example, a semi-rigid multi-conductor coax or a multiple single conductor coax. The analog voltage signals 50, 52, 54 and 56 are communicated to a signal processing unit 60 via a transmission channel comprising, for example, a flexible coax, or a twisted pair cable. As explained in greater detail below, the signal processing unit 60 is configured to jointly determine the radial and axial clearances of the blade 16 with respect to the shroud 22, based on the voltage signals corresponding to the measured capacitances. Output signals 62 and 64 of the signal processing unit 60 correspond to radial and axial clearance respectively. The output signals 62 and 64 may be communicated to a turbine control system 66 that is operable to implement a closed-loop control for maintaining radial and axial clearances within specified limits. The turbine control system 66 may incorporate thermal or mechanical actuation of the shroud, as discussed earlier. A data acquisition and storage system 68 may be utilized to record clearance data at different intervals of time. In certain embodiments, the data acquisition and storage system 68 includes a computer having a digital memory with special data acquisition and storage software, which enables a computer to retrieve and store digital data generated by the signal processing unit 60.

Figure 6:
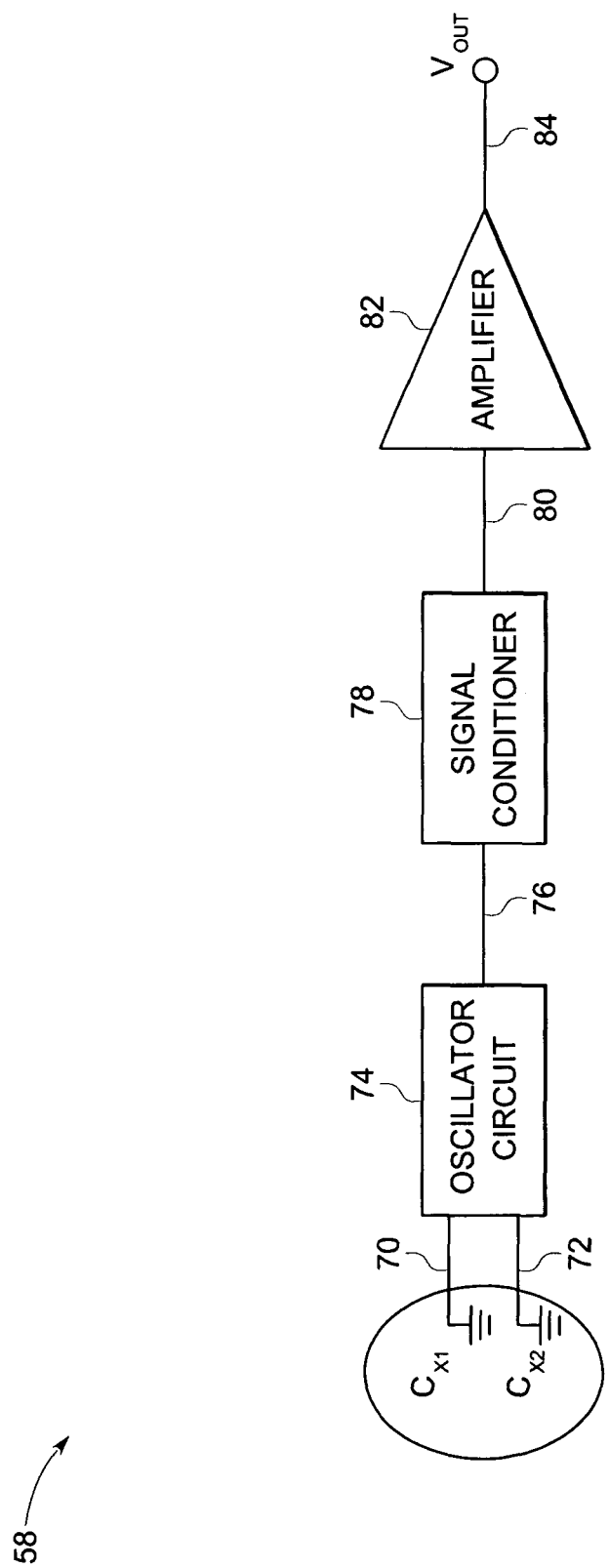
FIG. 6 is a block diagram of a capacitance to voltage conversion system in accordance with one aspect of the present technique.

FIG. 6 is a block diagram of an exemplary capacitance to voltage conversion unit 58 according to one embodiment of the present technique. In the illustrated embodiment, a measured capacitance $C_{X1}$ is coupled with a reference capacitance $C_{X2}$ in an oscillator circuit 74. The difference in capacitance is modeled as a phase change signal 76, which may be mapped to an analog voltage value. The signal 76 is generally fed to a signal conditioner 78 to eliminate anomalous values. The output 80 from the signal conditioner 78 is generally small in magnitude and is amplified by an amplifier circuit 82 to obtain a voltage signal 84. It should be noted that other capacitance to voltage conversion techniques may also employed in alterative embodiments of the present technique.

Figure 7:
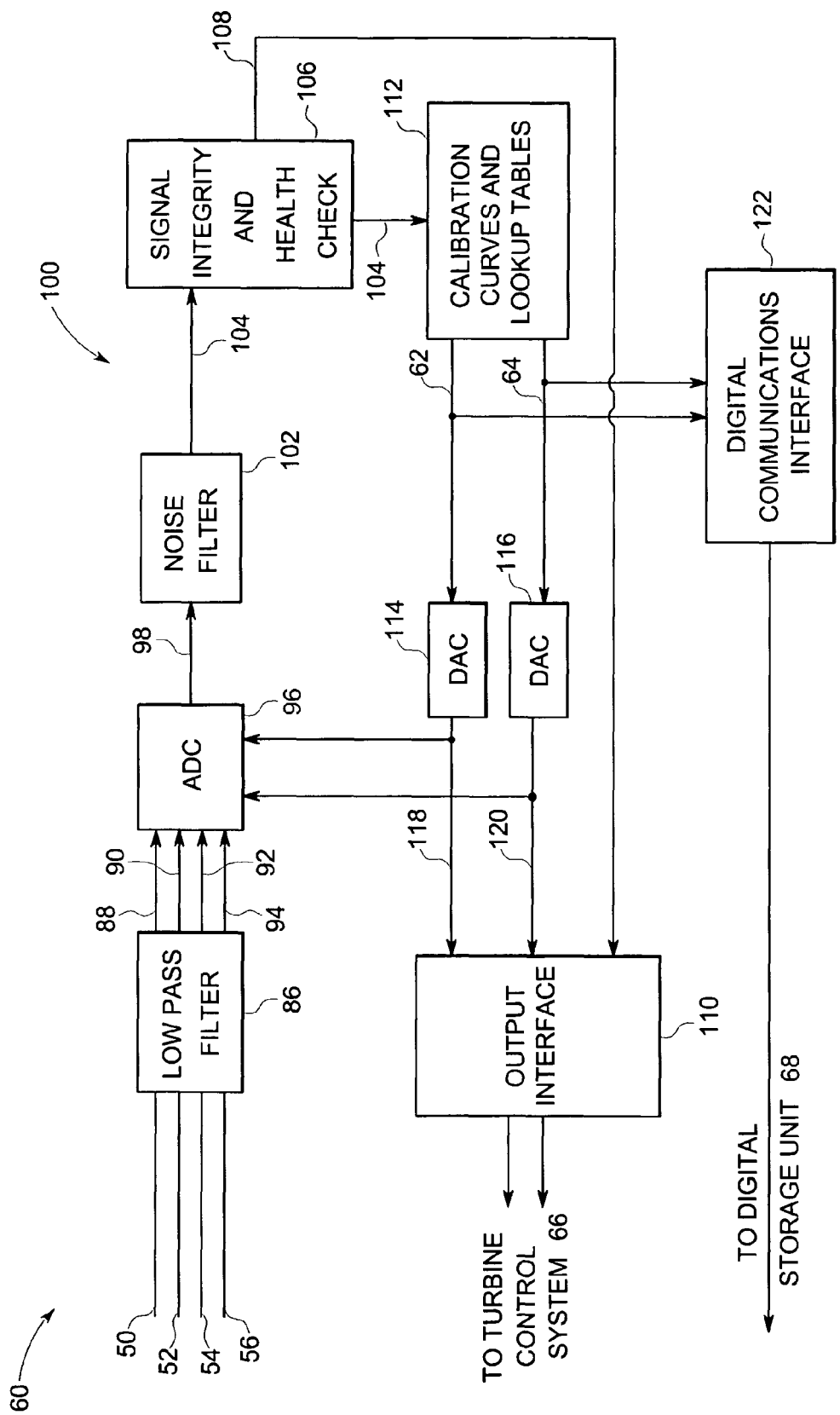
FIG. 7 is a block diagram of a signal processing unit in accordance with one aspect of the present technique.

FIG. 7 illustrates a block diagram signal processing unit 60 in accordance with one embodiment of the present technique. The analog voltage signals 50, 52, 54 and 56 produced by the capacitance to voltage conversion unit 58 are delivered to a low-pass filter 86 to eliminate high voltage values, which could arise due to factors such as thermal expansion of the probes, or mechanical vibration of the probes, among others. In one embodiment, the low pass filter 86 may include an anti-alias filter. The filtered analog voltage signals 88, 90, 92 and 94 are digitized via an analog to digital converter (ADC) 96. The output 98 of the ADC 96 comprises digital data, which is communicated a data quality enhancement system 100 to mitigate noise and errors associated with the digital data 98. The data quality enhancement system 100 includes a noise filter 102 and a signal security and health check block 106. The noise filter may include, for example, a median filter, to remove anomalous data points from the digital data 98. The output signal 104 of the noise filter is subject to the signal integrity and health check at block 106. Herein, signals originating from a pair of probes that were excited for a current measurement are compared to determine proper functioning of the probes. In case these signals have substantially differential values, an error signal 108 is generated and communicated to an output interface block 110, which may include, for example, an LED, a visual display unit, among others.

At block 112, the digitized voltage data is correlated to radial and axial clearances based on calibration curves and look-up tables to produce output signals 62 and 64, corresponding to radial and axial clearance respectively. The digitized output signals 62 and 64 may be converted into analog signals 118 and 120 by digital to analog converters (DAC) 114 and 116 before being communicated to the turbine control system 66. The clearances determined may also be displayed to an operator via the output interface 110. The digitized output signals 62 and 64 may further be recorded the digital storage unit 68 via a digital communications interface 122.

Referring now to FIGS. 8 and 9, exemplary calibration curves are illustrated for determining axial and radial clearances according to one embodiment of the present technique. FIG. 8 illustrates an exemplary calibration curve 124 showing variation of capacitive response (represented along a Y-axis) with variation of axial and different radial displacements in inches (represented along an X-axis) of a blade with respect to the shroud. Curves 126, 128 and 130 represent calibration data for a first probe for different radial displacements, while curves 132, 134 and 136 represent calibration data for a second probe for different radial displacements. In the illustrated example, curve 126 corresponds to a radial clearance of 20 mills (milli inches), curve 128 corresponds to a radial clearance of 40 mills and curve 130 corresponds to a radial clearance of 60 mills for the first probe. Curves 132, 134 and 136 represent corresponding calibration data for the second probe. As can be seen, sensitivity of the capacitance measurement with axial displacement of the blade generally increases with a decrease in radial clearance. FIG. 9 illustrates an exemplary calibration curve 124 showing variation of capacitive response (represented along a Y-axis) with variation of radial clearance (represented along an X-axis) of a blade within shroud. Curve 140 illustrates calibration data for the first probe while curve 142 illustrates the same for the second probe. As discussed earlier, capacitance between the blade and the sensor is a function of two variables, namely the radial clearance $d_R$ and the axial displacement $d_A$. Hence by measuring the capacitance ($C_1$, $C_2$) of the two probes, it is possible to obtain the actual values for the variables $d_A$ and $d_R$. As set forth above, the choice of the pair of probes for capacitance measurement is based on the relative axial position of the blade 16 within the shroud 22.

FIG. 10 is a flow chart illustrating an exemplary method 144 for sensing a clearance between a rotating blade (component) and a stationary shroud of a rotating machine in accordance with one embodiment of the present technique. The method begins by sensing a capacitance between the blade and the shroud as indicated at block 146. As explained earlier, this may be achieved via one or more capacitive probes disposed on the shroud proximate to the tip of the blade. At block 148, the capacitance signal produced by the probes is converted into an analog voltage, for example via a capacitance to voltage conversion unit as discussed earlier. The analog voltage is then digitized and anomalous data points are subsequently filtered (block 150). This digitized signal is then correlated with calibration curves and look up tables to jointly determine the axial and radial position of the blade with respect to the shroud (block 152). Radial and axial clearance between the shroud and the blade is then controlled via a closed-loop control strategy (block 154). As discussed earlier, block 154 may incorporate thermal actuation of the shroud mechanical actuation of the shroud and/or the blades.

The above-described technique thus potentially eliminates rub conditions in a turbine can by measuring the capacitance change as the axial and radial clearance at a given stage changes. Advantageously, the above sensing technique can be incorporated into a closed loop control system to maintain these clearances within specified values. Further, the design of the sensor head in accordance with certain embodiments of the present technique provides high sensitivity to area change to improve signal to noise ratio. The design also provides a high axial displacement measurement range without compromising on the radial measurement resolution.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A rotating machine, comprising:
   a rotating component affixed to a shaft for rotation within a stationary shroud;
   a plurality of sensors disposed within the shroud, each of the plurality of sensors being adapted to measure a parameter indicative of an axial and a radial displacement of the rotating component within the shroud and to produce a signal that corresponds to the parameter; and
   a circuit that receives the signal from each of the plurality of sensors and in response thereto calculates (a) the axial displacement of the rotating component within the shroud and (b) a radial displacement of the rotating component relative to the shroud;
   wherein the rotating component comprises a notch to self calibrate at least one of the sensors against signal drift.

2. The rotating machine of claim 1, wherein the parameter is a capacitance between the rotating component and the sensor.

3. The rotating machine of claim 1, wherein the rotating component comprises a blade.

4. The rotating machine of claim 1, wherein the rotating component comprises seal teeth.

5. The rotating machine of claim 2, wherein the plurality of sensors comprise a plurality of capacitive probes positioned in a staggered configuration on a sensor head disposed on the shroud.

6. The rotating machine of claim 1, wherein the shroud comprises a plurality of circumferentially spaced sensor probe access passageways.

7. The rotating machine of claim 1, further comprising a signal processing unit adapted to determine the axial displacement and the radial displacement of the rotating component based on a look-up table, a calibration curve, or combinations thereof.

8. The rotating machine of claim 2, further comprising a capacitance to voltage conversion system adapted to convert the signal produced by the sensors corresponding to the measured capacitance into a voltage value.

9. The rotating machine of claim 1, further comprising a control system adapted to control radial and axial clearances between the rotating component and the shroud via thermal actuation of the shroud.

10. The rotating machine of claim 3, wherein the sensor heads are formed from a material including platinum, rhodium, or combinations thereof.

11. A rotating machine, comprising:
a rotating component affixed to a shaft for rotation within a stationary shroud;
a plurality of sensors disposed within the shroud, each of the plurality of sensors being adapted to measure a capacitance between the rotating component and the sensor and to produce a signal that corresponds to the measured capacitance; and
a circuit that receives the signal from each of the plurality of sensors and in response thereto calculates (a) the axial displacement of the rotating component within the shroud and (b) a radial displacement of the rotating component relative to the shroud;
wherein the rotating component comprises a notch to self calibrate at least one of the sensors against signal drift.

12. A clearance sensing system for a rotating machine, comprising:
a plurality of sensor probes disposed within a stationary shroud, each of the plurality of sensor probes being adapted to measure a parameter indicative of an axial and a radial displacement of a rotating component within the shroud and to produce a signal that corresponds to the parameter; and
a circuit that receives the signal from each of the plurality of sensor probes and determines (a) the axial displacement of the rotating component within the shroud and (b) a radial displacement of the rotating component relative to the shroud;
wherein the rotating component comprises a notch to self calibrate at least one of the sensors probes against signal drift.

13. The sensing system of claim 12, wherein the parameter is a capacitance between the rotating component and the sensor.

14. The sensing system of claim 12, further comprising a signal processing unit adapted to determine the axial displacement and the radial displacement of the rotating component based on a look-up table, a calibration curve, or combinations thereof.

15. The sensing system of claim 12, wherein the plurality of sensor probes are disposed on a sensor head in a staggered manner to provide a large axial displacement range and radial measurement resolution of the sensor probes.

16. The sensing system of claim 13, further comprising a capacitance to voltage conversion system adapted to convert the signal produced by the sensor probes corresponding to the measured capacitance into an analog voltage.

17. The sensing system of claim 16, further comprising an analog-to-digital converter adapted to digitize the analog voltage produced by the capacitance to voltage conversion system.

18. A method for sensing a clearance between a rotating component and a stationary shroud of a rotating machine, comprising:
sensing a capacitance between the rotating component and the shroud and producing a signal corresponding to the sensed capacitance;
determining an axial displacement of the rotating component within the shroud in response to the signal; and
self calibrating at least one of the sensors producing signal against signal drift using a notch in the rotating component.

19. The method of claim 18, further comprising determining a radial displacement of the rotating component relative to the shroud in response to the signal.

20. The method of claim 19, further comprising:
converting the sensed capacitance into an analog voltage; and
digitizing the analog voltage and transmitting digitized voltage to a signal-processing unit for determination of the radial and axial displacements of the rotating component.

21. The method of claim 18, comprising calculating the radial displacement and the axial displacement of the rotating component via a calibration curve, a look-up table, or combinations thereof.

22. The method of claim 18, further comprising controlling radial and axial displacement of the rotating component relative to the shroud via thermal actuation of the shroud.

* * * * *